United States Patent

Kim

[11] Patent Number: 5,937,044
[45] Date of Patent: *Aug. 10, 1999

[54] SYSTEM AND METHOD FOR ALTERNATE BILLING ARRANGEMENT DURING A TELEPHONE CALL

[75] Inventor: Hack H. Kim, Plano, Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/724,239

[22] Filed: Sep. 30, 1996

[51] Int. Cl.$^6$ .................................................. H04M 15/00
[52] U.S. Cl. ........................ 379/121; 379/111; 379/114; 379/144
[58] Field of Search .................................. 379/111, 112, 379/113, 114, 115, 120, 121, 127, 130, 201, 133, 134, 140

[56] References Cited

U.S. PATENT DOCUMENTS

| | | | |
|---|---|---|---|
| 5,381,467 | 1/1995 | Rosinski et al. | 379/121 |
| 5,602,907 | 2/1997 | Hata et al. | 379/114 |
| 5,646,984 | 7/1997 | Oda | 379/114 |
| 5,754,633 | 5/1998 | Levy | 379/114 |
| 5,784,452 | 7/1998 | Carney | 379/268 |
| 5,822,411 | 10/1998 | Swale et al. | 379/111 |

FOREIGN PATENT DOCUMENTS

WO96/03000  2/1996  United Kingdom .......... H04M 15/00

Primary Examiner—Curtis A. Kuntz
Assistant Examiner—Binh K. Tieu

[57] ABSTRACT

A system and method for effecting alternate billing arrangements after a call from a calling party to a called party has been completed. Signaling information identifying an alternate billing request from a called party is first captured. The alternate billing request is then validated by determining whether it is permissible to shift all or part of the charges for the call to the called party.

36 Claims, 5 Drawing Sheets

SYSTEM AND METHOD FOR ALTERNATE BILLING ARRANGEMENT DURING A TELEPHONE CALL

BACKGROUND OF THE INVENTION

1. Field of the Invention

The present invention relates generally to telecommunications systems, and more specifically is directed toward systems and methods for effecting alternate billing arrangements.

2. Related Art

Telephone calls connecting distant subscribers are typically charged on a per-use basis. These charges typically accrue at a rate (e.g., per-minute charge) that is dependent upon the amount of network facilities that are being used over the path of the telephone call. Thus, a telephone call originating in New York and terminating in Seattle can justify a higher facility charge as compared to a telephone call originating in New York and terminating in New Jersey. This results since the New York-Seattle telephone call will traverse an entirely different transport path which includes additional switches, fiber-optic transport equipment, etc. Note that this scenario represents a simple example of how an inter-exchange carrier (IXC) can implement a form of price differentiation within their billing scheme. Note further that a similar scenario also exists within the local exchange carriers (LECs) as they connect subscribers that reside within various LATAs.

In addition to the price differentiation that is loosely tied to the physical distance between the calling and called parties, IXCs and LECs can also augment the standard connection charges based upon the types of services provided. For example, if a calling party desires to make a calling card call, then additional services are required. These additional services include database queries and validation procedures. Like the actual switching and transport facilities for the voice channel, the database and validation procedures represent valuable network resources that are being used by the calling party. The calling party can then be charged accordingly by increasing the per-minute charge of the calling card call.

As these examples illustrate, the billing of a telephone call is typically applied to the calling party. There are many instances, however, where the calling party desires to shift the billing of the telephone call to the called party. For example, a college student may desire to call his or her parents at home with the parents picking up the bill for the call. In other examples, a calling party at a pay phone may desire to place a long distance call without having enough coins to continually insert into the pay phone. In these types of scenarios, the calling party can simply decide to place a collect call. Collect calls typically require the provision of an operator to facilitate the call setup process. In this process, the operator or a computerized system intervenes to determine whether the called party is willing to accept the charges of the collect call. In a similar manner to calling card calls, the provision of an operator or computerized system to the collect call represents a valuable network resource that is being used by the calling party. The usage of additional resources allows an IXC or LEC to justify a higher per minute usage charge for the collect call.

To avoid these premium charges for collect calls, calling parties have resorted to other methods to shift the billing burden onto the called party. In one example, the calling party can place a first call to the called party, hang up, and wait for the called party to place a second call back to the original calling party. In another example, the calling party can place a collect call to the called party who will refuse the charges then subsequently place a call to the original calling party. Numerous variations to this theme exist.

While the bill-shifting techniques described above are useful to varying degrees, they each require that a particular procedure be followed prior to a call. These procedures are often inflexible in requiring that a decision be made in advance to have the charges revert to the called party. What is therefore needed is a more flexible alternative that allows the calling and called parties to decide how to shift the billing burden.

SUMMARY OF THE INVENTION

The present invention satisfies the above mentioned needs by providing a system and method for effecting alternate billing arrangements during a switched bandwidth connection (e.g., a telephone call). After a connection is established from a calling party to a called party, the called party is given the opportunity to alter the billing arrangement. In conventional systems, the cost of the connection is levied solely on the calling party. In the present invention, the called party can shift to himself all or part of the cost of the connection that was originated by the calling party.

In implementation, the alternate billing system comprises a means for identifying signaling information (in-band or out-of-band) from the called party. This signaling information identifies the called party's willingness to accept all or part of the cost of the call. In one embodiment, the identifying means is embodied as a dual-tone multi-frequency (DTMF) detector. This DTMF detector is situated on the unidirectional part of the provisioned channel that is dedicated to transmission from the called party. This DTMF detector monitors the connection during its entire duration to determine whether the called party has generated a predefined sequence of one or more tones. This predefined sequence of tones identifies an alternate billing request by the called party. In other embodiments dedicated to integrated services digital network (ISDN) connections, the signaling information is identified through the monitoring of the D channel in the ISDN basic rate interface.

After an alternate billing request is identified, it is then determined whether the alternate billing request is permitted. Examples of alternate billing requests that are denied include situations where the called party is situated at a pay phone, the called party has a poor credit history, etc. If the alternate billing request is approved, the system informs the billing system of the new billing arrangement.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Figure 1:
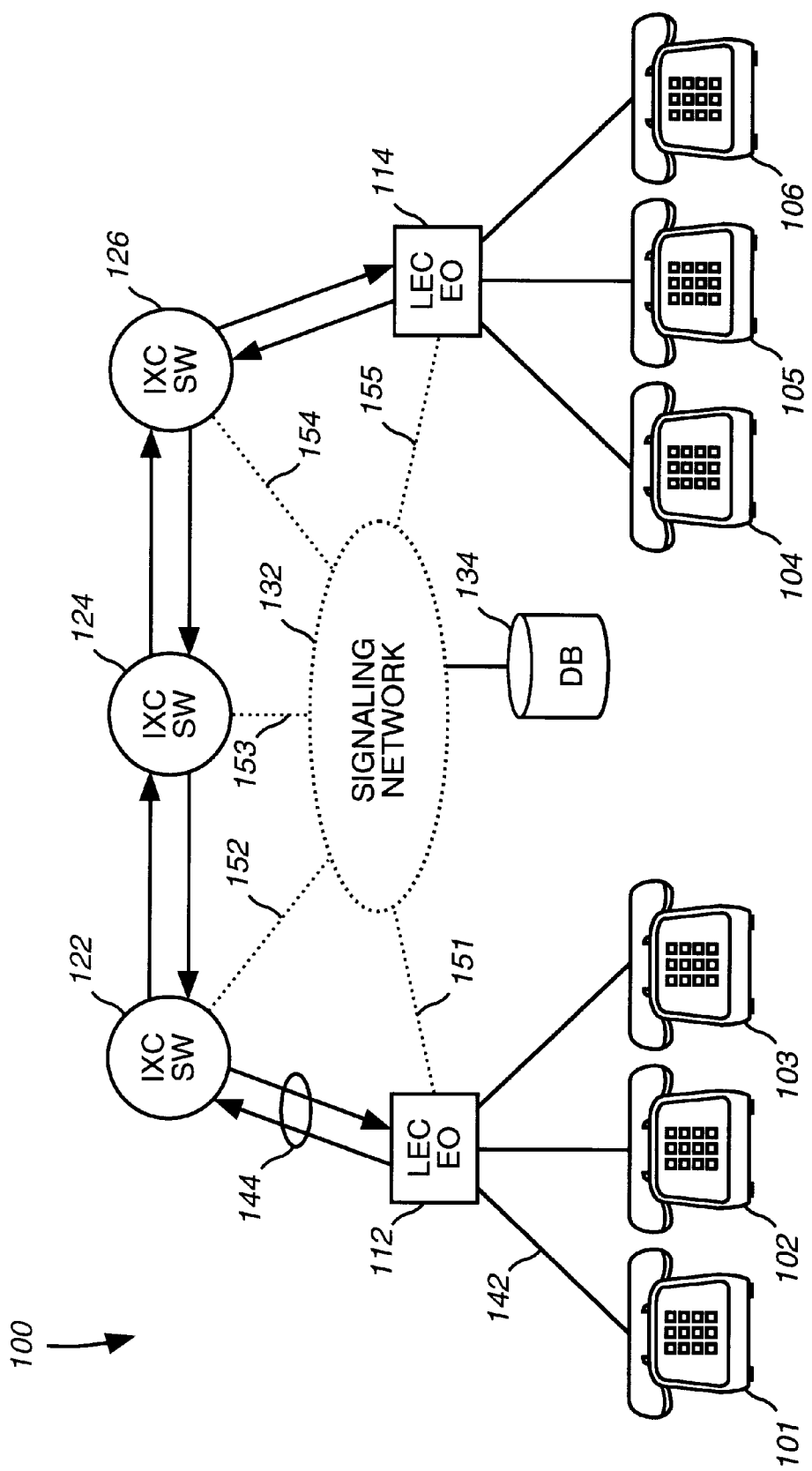
FIG. 1 illustrates an exemplary long distance connection on a public switched telephone network.

FIG. 1 illustrates an exemplary long-distance connection in a public switched telephone network (PSTN) 100. PSTN 100 includes both interexchange carriers (IXCs) and local exchange carriers (LECs). Individual subscribers 101–106 are connected to a LEC via an LEC end office (EO). As illustrated, subscribers 101–103 are connected to EO 112 and subscribers 104–106 are connected to EO 114. An LEC EO 112, 114 generally includes switching equipment to complete calls among individual subscribers.

Connections 142 from subscribers 101–106 to one of EOs 112, 114 are typically provided at least in part by a twisted pair of copper wires. Connections between individual subscribers 101–106 residing in distant locations are typically provided by both an LEC and an IXC. Consider a telephone call connection between subscriber 101 and subscriber 106. In this connection, a telephone call would traverse a path that included EO 112, IXC switch (SW) 122, IXC SW 124, IXC SW 126 and EO 114.

To initiate this telephone call, subscriber 101 dials the number of the desired destination. The dialed digits are collected and analyzed in conjunction with information about the calling station by data processing equipment (not shown) within EO 112. Upon recognition that the dialed number is not a local destination, EO 112 directs the telephone call to IXC SW 122 through a trunk line 144. Routing of the telephone call through the LEC and IXC switches is coordinated through a common channel signaling (CCS) network 132 that uses a protocol such as Signaling System #7 (SS7). Communication with CCS network 132 is provided via signaling links 151–155. CCS network 132 may access a database (DB) 134 to look up routing information or subscriber-specific data.

Figure 2:
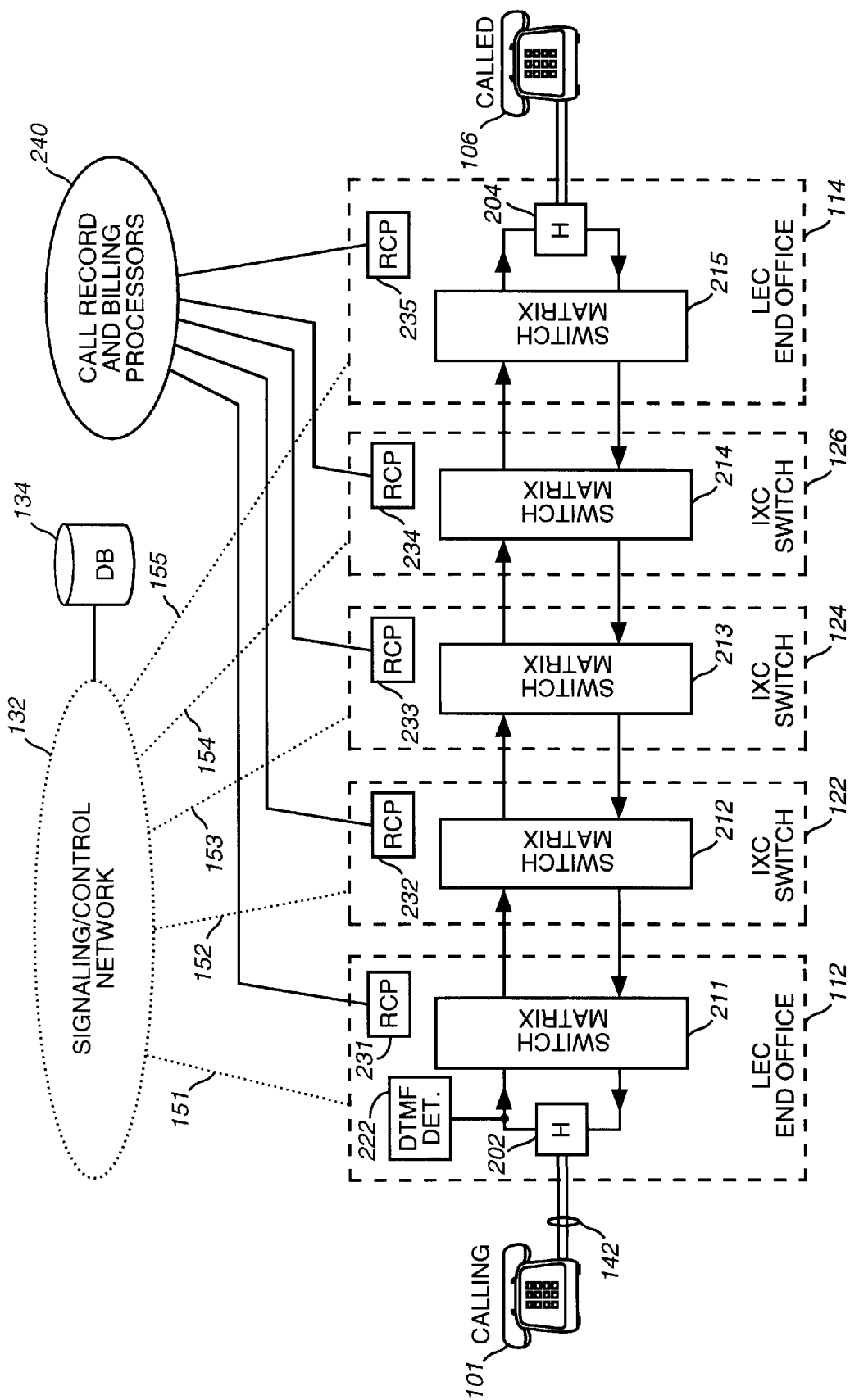
FIG. 2 illustrates billing and tone detecting elements in an exemplary long distance connection.

FIG. 2 illustrates a more detailed view of the connection of FIG. 1 that further includes both billing and tone detecting elements. The illustration is provided for an exemplary connection between subscribers 101 and 106. As noted above, subscriber 101 is connected to EO 112 by a twisted pair of copper wires 142. This twisted pair of wires 142 carries both directions of the conversation between subscribers 101 and 106. The two-way transmission on twisted pair 142 is facilitated by hybrids within the telephone of subscriber 101 and at EO 112. For simplicity, only hybrid 202 within EO 112 is shown.

A hybrid is a special directional circuit that distinguishes between incoming and outgoing signals. A hybrid within the telephone of calling party 101 can induce a current in twisted pair 142 as calling party 101 speaks into the mouthpiece of the telephone. The hybrid can also detect currents caused by called party 106 and provides an audio signal to the telephone earpiece of subscriber 101. Generally, a hybrid is used so that a given telephone does not receive its own outgoing signals.

In EO 112, twisted pair 142 is coupled to hybrid 202 to separate the subscriber loop signal into two unidirectional signals. These unidirectional signals are individually switched, amplified, digitized, and transmitted in PSTN 100. As further illustrated in FIG. 2, EO 112 also includes switching matrix 211 that dynamically connects subscriber 101 either to another attached subscriber 102, 103 or to another switch via a trunk. In the exemplary connection between subscribers 101 and 106, the unidirectional signal in the direction of subscriber 106 passes through IXC switches 212–214 in succession. At EO 114, switch matrix 215 completes the call through hybrid 204 to subscriber 106. Generally, each of switches 211–215 contains a controller (not shown) such as a small programmable computer, that controls the switching matrix and communicates with CCS network 132 via signaling links 151–155.

As further illustrated in FIG. 2, EO 112 further includes dual tone multi-frequency (DTMF) detector 222. DTMF detector 222 recognizes digits dialed from a touch tone phone of calling party 101. In typical telephone calls, DTMF detector 222 is engaged only during call initiation. As illustrated, DTMF detector 222 is connected to the unidirectional signal that is transmitted in the direction of called party 106. In this manner, DTMF detector 222 is able to recognize the digits dialed by calling party 101. These captured digits are provided to the controller (not shown) of switch matrix 211 to identify called party 106. When an adequate number of digits are provided, the controller can decide how to route or terminate the call.

After the call is completed from calling party 101 to called party 106 record collecting processes (RCPs) operating in one or more switches in the path of the call are started. In FIG. 2 each switch 211–215 starts a respective RCP 231–235, respectively. The resulting raw call detail records (CDRs) from each switch 211–215 are collected and fed into call record and billing processors 240. Call record and billing processors 240 derives billing information from raw CDRs. In this process, CDRs are grouped as relating to a single telephone call, discrepant or redundant CDRs are resolved, and the origin, destination, duration and applicable rate for each call are determined. The charges for calling party 101 are then tabulated.

As noted above, the conventional call setup and billing process is designed to attribute the entire charge for network usage to the calling party. Shifting of any charges incurred for the telephone call can be accomplished through collect calling and manual callback processes. Each of these alternatives has proven inflexible to meet the needs of individual subscribers.

Figure 3:
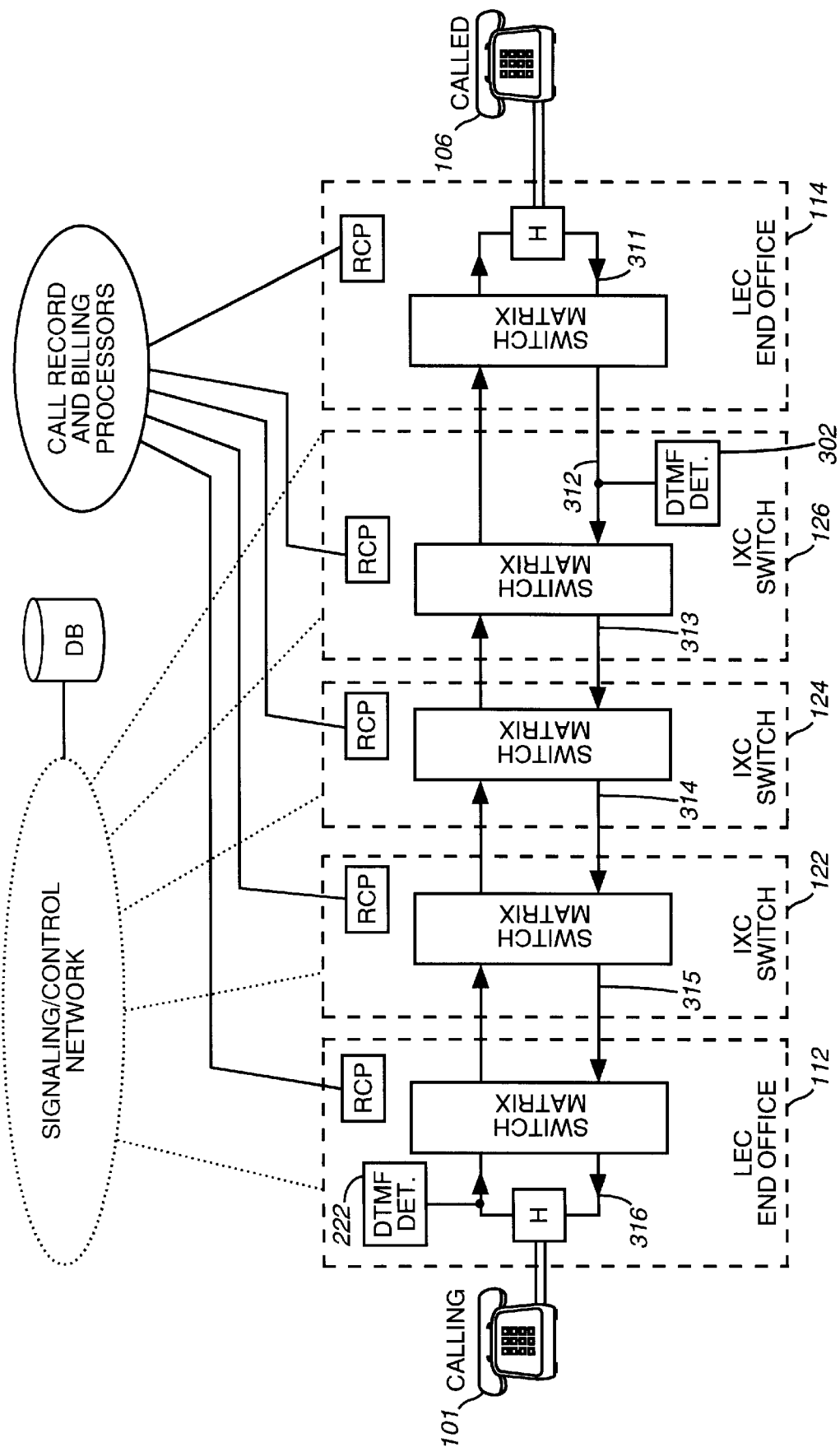
FIG. 3 illustrates a system for detecting an alternate billing request and effecting an alternate billing arrangement.

FIG. 3 illustrates a preferred embodiment of the present invention that allows a calling and called party to dynamically apportion the billing burden during the telephone call. As shown, an additional DTMF detector 302 is placed on unidirectional link 312. Unidirectional link 312 is one link in the unidirectional path in the direction of calling party 101. DTMF detector 302 is designed exclusively to capture touch tone digits that are generated by the called party after the telephone call has been completed. Briefly, the touch tone digits generated by called party 106 determine how much of the billing burden should be shifted from calling party 101 to called party 106. In conventional systems, dialing signals from a called party typically held no significance.

Note that the illustration of FIG. 3 places DTMF detector 302 at the interface between LEC EO 114 and IXC switch 126. This choice is largely one of convenience for description purposes. In the exemplary connection, the billing function for the long-distance telephone call is being provided by the IXC. In the simplest scenario, the IXC itself collects the digits from called party 106. Link 312 represents the first opportunity that the IXC could directly collect the touch tone digits generated by calling party 106. As will become apparent from the following description, DTMF detector 302 could be placed on any of unidirectional links 311–316 in the unidirectional path.

In operation, DTMF detector 302 remains on-line throughout the duration of the telephone call from calling party 101 to called party 106. As noted above, conventional systems utilized DTMF detector 222 only during a short digit collection timeframe prior to completion of a telephone call to capture input from a calling party only.

Figure 4:
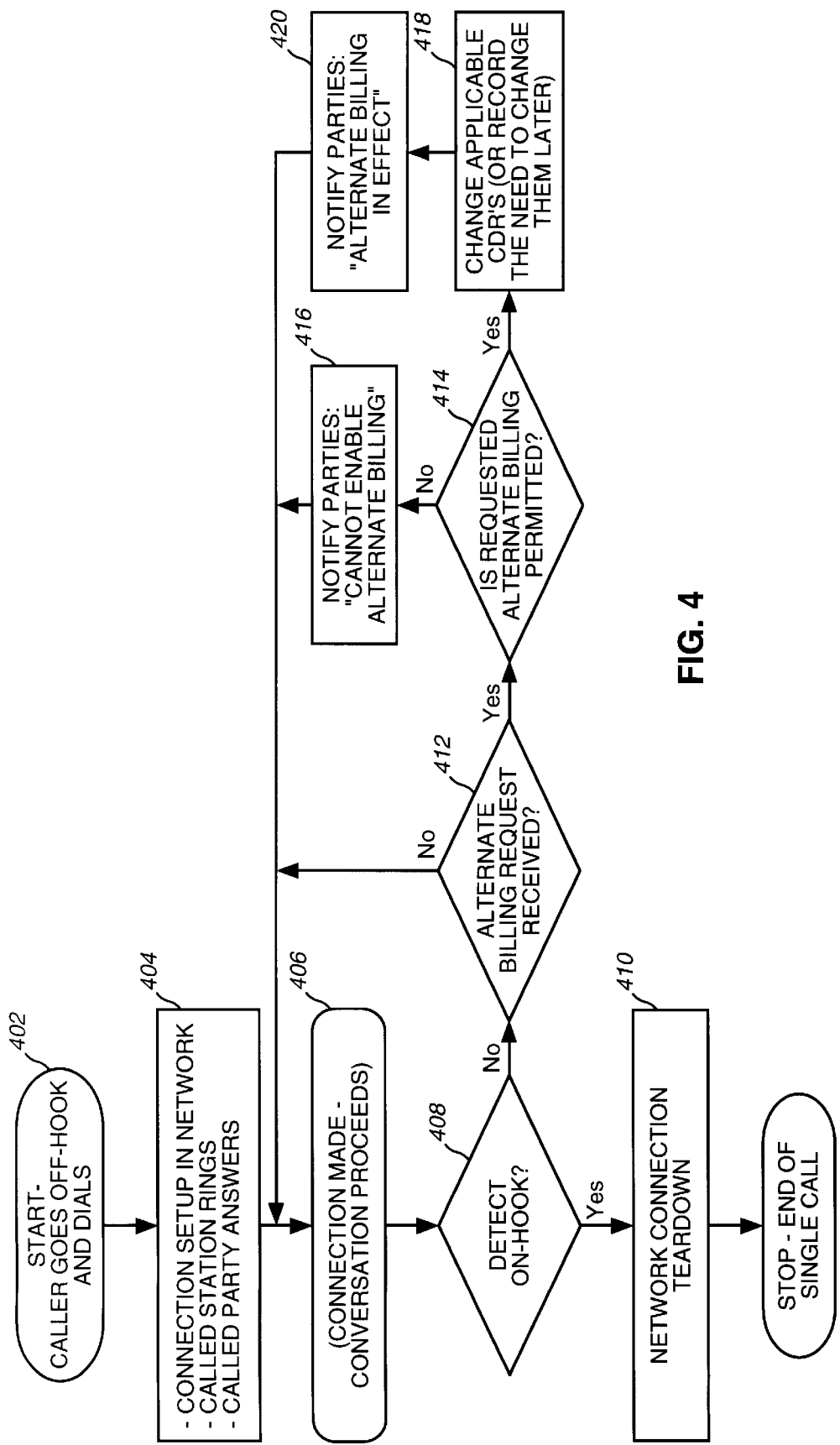
FIG. 4 illustrates a flow chart describing steps within the alternate billing process.

FIG. 4 illustrates a flow chart of the processing of a telephone call including the bill-shifting function provided by the operation of DTMF detector 302. The process begins at step 402 where calling party 101 goes off-hook and dials the number of called party 106. As noted above, the number of called party 106 is captured by DTMF detector 222 during the call setup phase of the call. After the controller in matrix switch 112 receives the dialed digits, a connection is established to called party 106 at step 404. Specifically, at step 404, a voice grade channel is provisioned across switches 112, 122, 124, 126 and 114 using signaling network 132. Once the voice grade channel is provisioned, matrix switch 114 causes the called party's telephone to ring. If called party 106 answers, a connection is then established.

The completion of the connection is represented by step 406. At this point in time, a conversation between calling party 101 and called party 106 ensues. During this conversation, controllers within the switches will continue to determine at step 408 when either party 101 or 106 hangs up (i.e., on hook) signaling the end of the telephone call. If a controller determines at step 408 that the telephone call is completed, the connection between calling party 101 and called party 106 is taken down at step 410.

In addition to determining when an on-hook condition is detected, one or more controllers also determine at step 412 whether an alternate billing request is received. In one embodiment, an alternate billing request is signaled based upon the receipt of touch tone digits by DTMF detector 302. Note again that DTMF detector 302 can be located at any point along the unidirectional path in the direction of calling party 101. DTMF detector 302 can be dedicated exclusively to the collection of alternate-billing requests by the called party. Any predefined sequence of digits can be used to designate the amount of the bill (e.g., 100%, 75%, 50%, etc.) that will be shifted to the called party. For example, a controller that receives digits from DTMF detector 302 may determine that the telephone call should be billed entirely to the called party based upon the receipt of "##". Alternatively, the controller can shift a percentage of the cost of the call to the called party based upon the receipt of "#X", where X represents the % of the bill to shift.

Generally, if no alternate billing request is detected at step 412, the telephone call processing continues in a standard fashion. If, however, a controller determines that an alternate billing request has been received at step 412, then a validation step is performed at step 414. This validation step determines whether it is permissible to shift the cost of the call to the called party. This determination can depend on the type of phone or class of service at either end, subscriber account history, subscriber preferences, etc.

For example, consider the case where called party 106 is on a pay phone. If this is the case, shifting of the billing to called party 106 is completely impermissible due to the unlikelihood that called party 106 would pay for the call. A similar result would also be reached if it is determined that called party 106 has a history of credit problems. Information on customers and their respective preferences can be stored in database 134 that is accessible by signaling network 132.

If the controller determines that the alternate billing request is not permitted, the calling and called parties are informed at step 416. The processing of the telephone call then proceeds normally until termination. If, however, at step 416, the controller determines that the alternate billing request is permitted, then the controller changes the applicable CDRs that it generates. The modified CDR would then indicate that a percentage of the cost of the call should be billed to the called party. Alternatively, the controller could simply communicate or record the need to modify the CDR at a later point in time (step 418). Once the CDR has been modified or a need to modify a CDR has been noted, the parties are notified of the acceptable alternate billing arrangement at step 420. Thereafter, the processing of the telephone call continues normally until termination.

Figure 5:
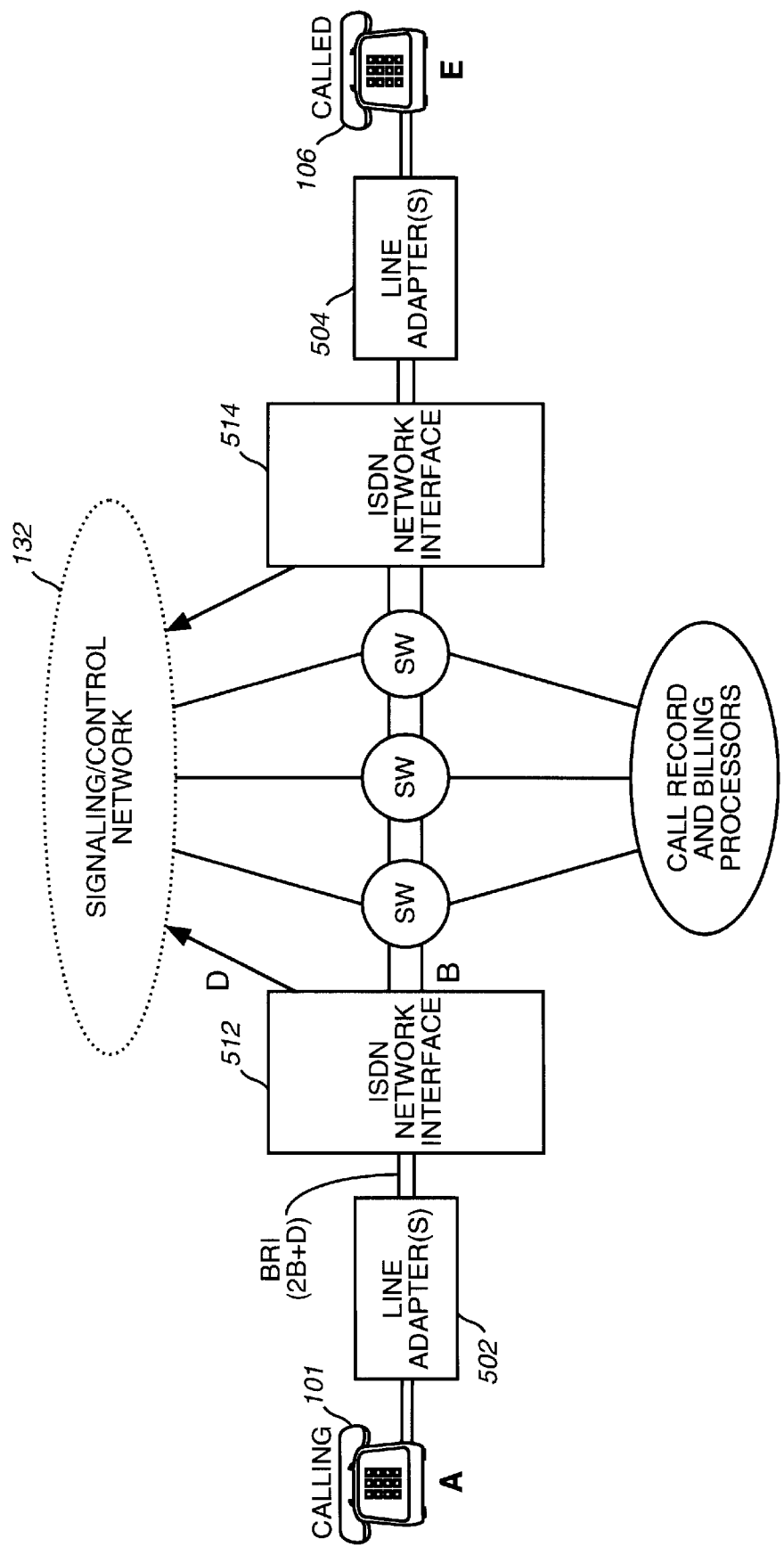
FIG. 5 illustrates an exemplary integrated services digital network connection between calling and called parties.

FIG. 5 illustrates an alternative method of implementing an alternate billing system in the context of an integrated services digital network (ISDN) connection. As shown, both calling party 101 and called party 106 are connected to line adapters 502 and 504, respectively, to match the type of telephone equipment and subscriber loop characteristics to the standard Basic Rate Interface (BRI). The digital BRI signal contains two bearer channels plus one data channel (2B+D). The data channel (D) is typically used for signaling purposes. J. Bellamy, "Digital Telephony", Chapter 9.3 describes the BRI interface in greater detail and is herein incorporated by reference in its entirety.

Generally, ISDN network interfaces 512 and 514 direct D channel signaling information to signaling network 132. The voice carrying B-channel, on the other hand, is routed through a circuit switched or channel switched digital network to reach the terminating party. By monitoring the D channel information, particularly from a called party, an ISDN network can receive, validate, and act upon requests for alternate billing in a manner similar to that outlined in FIG. 4.

More generally, the implementation of alternate billing arrangements can be used in various environments that include switched connections established for standard voice communication, data communication, video conferencing, etc. These switched connections are available in various bandwidths including voice grade channels (DSO), T1 channels, STS-1 channels, etc. Recognition of alternate billing requests are implementation dependant and may include in-band or out-of-band signaling requests.

While the invention has been particularly shown and described with reference to preferred embodiments thereof, it will be understood by those skilled in the relevant art that various changes in form and details may be made therein without departing from the spirit and scope of the invention.

What is claimed is:

1. A system for processing alternate billing requests for a connection between a calling party and a called party, comprising:

means for identifying a dual-tone multi-frequency signaling information from the called party;

means for receiving said duel-tone multi-frequency signaling information from said identifying means at a given time throughout the duration of the connection, said signaling information defining an alternate billing request for the duration of the connection, which is received from the called party, wherein said alternate billing request including a designation of an amount to be shifted to the called party;

means for determining whether said alternate billing request is permitted; and means for effecting a change in the billing for the connection in accordance with said alternate billing request wherein said change occurs at a time subsequent to the connection.

2. The system of claim 1, wherein said identifying means is a dual tone multi-frequency detector situated on a part of a unidirectional voice path dedicated to a voice transmission from the called party to the calling party, said unidirectional voice path defined between a first end office connected to the calling party and a second end office connected to the called party.

3. The system of claim 2, wherein said dual tone multi-frequency detector identifies one or more dialed digits from the called party.

4. The system of claim 2, wherein said dual tone multi-frequency detector is situated on a part of said unidirectional voice path controlled by an inter-exchange carrier.

5. The system of claim 2, wherein said dual tone multi-frequency detector is situated on a part of said unidirectional voice path controlled by a local exchange carrier.

6. The system of claim 2, wherein said unidirectional voice path is defined between a first hybrid in said first end office and a second hybrid in said second end office, said first hybrid connected to the calling party via a first twisted pair and said second hybrid connected to the called party via a second twisted pair.

7. The system of claim 1, further comprising means for modifying a call detail record to indicate a billing arrangement identified by said alternate billing request.

8. The system of claim 1, wherein said means for determining determines whether the called party is at a pay phone.

9. The system of claim 1, wherein said means for determining checks an account history for the called party.

10. The system of claim 1, wherein said connection is a standard telephone call.

11. The system of claim 1, wherein said connection is an integrated service digital network call and said identifying means monitors signaling information contained in a D channel.

12. The system of claim 1, wherein said connection is a data communication channel.

13. The system of claim 1, wherein said connection is a video connection.

14. A method for processing alternate billing requests for a connection between a calling party and a called party, comprising the steps of:
  (1) identifying a dual-one multi-frequency signaling information generated at a given time during the connection by the called party, wherein said dual-tone multi-frequency signaling information defines an alternate billing request for the duration of the connection from the called party said alternate billing request comprises:
    (a) a designation of an amount to be shifted to the called party;
  (2) determining whether said alternate billing request is permitted; and
  (3) effecting a change in billing for the connection in accordance with said alternate billing request wherein said change occurs at a time subsequent to the connection.

15. The method of claim 14, wherein said step (1) comprises the step of identifying dialed digits from the called party by a dual tone multi-frequency detector situated on a part of a unidirectional voice path dedicated to a voice transmission from the called party to the calling party, said unidirectional voice path defined between a first end office connected to the calling party and a second end office connected to the called party.

16. The method of claim 15, wherein said step (1) comprises the step of identifying dialed digits from the called party by a dual tone multi-frequency detector, wherein said dual tone multi-frequency detector is situated on a part of said unidirectional voice path controlled by an inter-exchange carrier.

17. The method of claim 15, wherein said step (1) comprises the step of identifying dialed digits from the called party by a dual tone multi-frequency detector, wherein said dual tone multi-frequency detector is situated on a part of said unidirectional voice path controlled by a local exchange carrier.

18. The method of claim 14, further comprising the step of modifying a call detail record to indicate a billing arrangement identified by said alternate billing request.

19. The method of claim 14, wherein said step (2) comprises the step of determining whether the called party is at a pay phone.

20. The method of claim 14, wherein said step (2) comprises the step of checking an account history for the called party.

21. The method of claim 14, wherein said step (1) comprises the step of monitoring signaling information contained in a standard telephone call.

22. The method of claim 14, wherein said step (1) comprises the step of monitoring signaling information contained in a D channel of an integrated services digital network call.

23. The method of claim 14, wherein said step (1) comprises the step of monitoring signaling information contained in a data communication channel.

24. The method of claim 14, wherein said step (1) comprises the step of monitoring signaling information contained in a video connection.

25. In a public switched telecommunications network environment that provides a connection between a calling party and a called party, the connection comprising two unidirectional channels, a first unidirectional channel dedicated to transmission from the calling party to the called party and a second unidirectional channel dedicated to transmission from the called part to the calling party, a method for controlling the processing of the connection, comprising the steps of;
  (1) monitoring, by a dual tone multi-frequency detector, signaling information from the called party; and
  (2) using said signaling information to control an element of processing associated with the connection,
    wherein said signaling information is generated at any time during the connection and defines an alternate billing request for the duration of the connection, which is received from the called party, said alternate billing request including a designation of an amount to be shifted to the called party;
    wherein said element of processing effects a change in the billing for the connection if permitted in accordance with said alternate billing request wherein said change occurs at a time subsequent to the connection, and
    wherein said dual tone multi-frequency detector is situated on a part of the second unidirectional voice channel, the second unidirectional voice channel defined between a first end office connected to the calling party and a second end office connected to the called party.

26. The method of claim 25, wherein said step (1) comprises the step of monitoring signaling information from the called party to control an apportionment of the billing of the connection between the calling party and the called party.

27. The method of claim 25, wherein said step (1) comprises the step of monitoring signaling information from the called party, wherein said dual tone multi-frequency detector is situated on a part of the second unidirectional voice channel that is controlled by an inter-exchange carrier.

28. The method of claim 25, wherein said step (1) comprises the step of monitoring signaling information from the called party, wherein said dual tone multi-frequency detector is situated on a part of the second unidirectional voice channel that is controlled by a local exchange carrier.

29. A method in a communications system for processing a connection between a calling party to a called party, wherein the calling party initiates the connection and information associated with the connection is located within the communications system, the method comprising:

detecting the connection between the calling party and the called party on the communications system;

monitoring the connection for a request initiated by the called party to shift a desired amount of a rate of the connection at any given time during the connection to the called party in response to detecting the call;

determining whether shifting the desired amount of the rate of the connection from the calling party to the called party is permitted, wherein the determination is made based on using the information associated with the connection; and shifting the desired amount of the rate of all the call to the called party at a given time subsequent to completion of the connection, wherein the rate of the call is shifted by the communication system after termination of the connection.

30. The method of claim 29, wherein the calling party has a type of phone and wherein the information about the connection comprises the type of phone.

31. The method of claim 29, wherein the called party has a type of phone and wherein the information about the connection comprises the type of phone.

32. The method of claim 29, wherein the information comprises subscriber preferences for the called party.

33. The method of claim 29, wherein the information comprises a credit history of the called party.

34. The method of claim 29, wherein the step of shifting of the cost of the call to the called party comprises shifting a portion of the cost of the call to the called party.

35. The method of claim 29, wherein the step of shifting of the cost of the call to the called party comprises shifting all of the cost of the call to the called party.

36. The method of claim 29, wherein monitoring of the connection for the request is accomplished using a dual-tone multi-frequency detector.

* * * * *